US006530264B1

(12) United States Patent
Rink et al.

(10) Patent No.: US 6,530,264 B1
(45) Date of Patent: Mar. 11, 2003

(54) DETECTION SYSTEMS AND METHODS

(75) Inventors: Karl K. Rink, Liberty; David J. Green, Brigham City; L. John Pierotti, Huntsville; Anthony M. Young, Brigham City, all of UT (US); George R. Neff, La Canada; Jimmie K. Neff, Granada Hills, both of CA (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/714,696

(22) Filed: Nov. 16, 2000

(51) Int. Cl.$^7$ .............................................. G01M 3/20
(52) U.S. Cl. ..................................................... 73/40.7
(58) Field of Search ........................................... 73/40.7

(56) References Cited

U.S. PATENT DOCUMENTS

| | | | |
|---|---|---|---|
| 2,486,199 A | 10/1949 | Nier | ........................... 73/40.7 |
| 2,844,735 A | 7/1958 | Creutz et al. | |
| 3,135,865 A | 6/1964 | Reed et al. | .................. 250/395 |
| 3,179,806 A | 4/1965 | Dixon et al. | ................ 250/303 |
| 3,416,359 A | 12/1968 | Durbin et al. | |
| 3,738,158 A | 6/1973 | Farrell et al. | |
| 3,956,923 A | 5/1976 | Young et al. | |
| 4,920,785 A | 5/1990 | Etess | |
| 5,001,343 A | 3/1991 | Gnade et al. | |
| 5,010,761 A | 4/1991 | Cohen et al. | |
| 5,170,660 A | 12/1992 | Lehmann | |
| 5,351,527 A | 10/1994 | Blackburn et al. | |
| 5,369,983 A | 12/1994 | Grenfell | ..................... 73/40.7 |
| 5,390,533 A | 2/1995 | Schulte et al. | |
| 5,470,104 A | 11/1995 | Smith et al. | |
| 5,494,312 A | 2/1996 | Rink | |
| 5,531,473 A | 7/1996 | Rink et al. | |
| 5,591,900 A | 1/1997 | Bronowocki et al. | |
| 5,669,629 A | 9/1997 | Rink | |
| 5,767,391 A | 6/1998 | Wong | |
| 5,884,938 A | 3/1999 | Rink et al. | ................... 280/741 |
| 5,941,562 A | 8/1999 | Rink et al. | |

FOREIGN PATENT DOCUMENTS

| | | | | |
|---|---|---|---|---|
| CH | 425 645 | | 6/1967 | |
| DE | 288727 | * | 4/1991 | ................. 73/40.7 |
| EP | 0 566 500 | | 10/1993 | |
| FR | 2344008 | * | 11/1977 | ................. 73/40.7 |
| SU | 1493901 | * | 7/1989 | ................. 73/40.7 |

OTHER PUBLICATIONS

Radiflo commerial booklet, American Electronics, Inc., Mar. 22, 1966, pp. 1–6.*
Murgatroyd, J. L., "Leak–Rate Determination Using Krypton–85", IEEE Transactions on Instrumentation and Measurement, vol. IM–21, No. 1, Feb. 1972, pp. 41–48.*
Sterlyadkina, O. G. et al., "A Method of Determining the Tightness of Small Parts with the Use of Radioactive Krypton–85 Gas", Soviet Journal Nondestructive Testing (USA), vol. 17, No. 5, Jan. 1982, pp. 404–409.*
Nondestructive Testing Handbook, Third Edition, vol. 1, Leak Testing, American Society for Nondestructive Testing, 558–578, 1998.
B. Cassen and D. Burnham: A Method of Leak Testing Hermetically Sealed Components Utilizing Radioactive Gas, *International Journal of Applied Radiation and Isotopes*, vol. 9, 54–59, 1960.

* cited by examiner

Primary Examiner—Daniel S. Larkin
(74) Attorney, Agent, or Firm—Pauley Petersen Kinne & Erickson

(57) ABSTRACT

Systems for use in leak detection and methods for leak detection are provided wherein a radioactive trace material is externally applied to a wall of a chamber which contains a fluid at a relatively high internal pressure.

31 Claims, 6 Drawing Sheets

DETECTION SYSTEMS AND METHODS

CROSS REFERENCE TO RELATED APPLICATIONS

The subject matter of this application is related to prior U.S. patent application Ser. No. 935,016, filed on Sep. 22, 1997, now Rink et al., U.S. Pat. No. 5,884,938, issued Mar. 23, 1999, which application in turn is a continuation-in-part application of application, Ser. No. 08/632,698, filed on Apr. 15, 1996, now Rink, U.S. Pat. No. 5,669,629, issued Sep. 23, 1997. The disclosures of these related patent applications are hereby incorporated by reference herein and made a part hereof, including but not limited to those portions which specifically appear hereinafter.

BACKGROUND OF THE INVENTION

This invention relates generally to detection systems and methods and, more particularly, to systems and methods for the detection of leaks from devices adapted to contain a pressurized fluid at a relatively high internal pressure, such as certain inflator devices used in the inflation of inflatable articles, such as an inflatable vehicle occupant restraint airbag cushions used in inflatable restraint systems.

It is well known to protect a vehicle occupant using a cushion or bag, e.g., an "airbag cushion," that is inflated or otherwise expanded with gas when the vehicle encounters sudden deceleration, such as in the event of a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as an "inflator."

The term "compressed gas inflator" is commonly used to refer to various inflator devices which contain a selected quantity of compressed gas. For example, one particular type of compressed gas inflator, commonly referred to as a "stored gas inflator," simply contains a quantity of a stored compressed gas which is selectively released to inflate an associated airbag cushion. A second type of compressed gas inflator, commonly referred to as a "hybrid inflator," typically supplies or provides inflation gas as a result of a combination of stored compressed gas with combustion products such as result from the combustion of a gas generating material, e.g., a pyrotechnic.

In the past, stored gas inflators have generally been at a disadvantage, as compared to pyrotechnic inflators, in terms of size, weight, and/or cost. Such disadvantages have been especially significant in view of the general design direction of inflatable restraint systems toward relatively small, lightweight, and economical modern vehicle components and assemblies. In particular, the need in compressed gas inflators to store a gas at relatively high pressures typically results in the need for such an inflator device to include a pressure vessel having relatively thick walls. As a result, such vessels tend to be more bulky, heavy, and costly than otherwise desired for modern vehicle components.

Commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996 disclose and relate to a recently developed type of inflator device, sometimes called a "fluid fueled inflator." Such inflator devices typically utilize a fuel material in the form of a fluid, e.g., in the form of a gas, liquid, finely divided solid, or one or more combinations thereof, in the formation of an inflation gas for an airbag cushion. In one form of fluid fueled inflator, such a fluid fuel material is burned to produce gas which contacts a quantity of stored pressurized gas to produce inflation gas for use in inflating a respective inflatable device.

While such types of inflator devices can successfully overcome, at least in part, some of the problems associated with the above-identified prior types of inflator devices, there has been a continuing need and demand for further improved apparatus and techniques for inflating an inflatable device, such as an airbag cushion.

In at least partial response thereto, further efforts have led to the development of an apparatus for and methods of gas generation which at least in part rely on the decomposition or dissociation of a selected gas source material for gas generation. In particular, such developmental efforts have resulted in the development of an inflator device which is at least in part the subject of the above-identified patents: Rink, U.S. Pat. No. 5,669,629 and Rink et al., U.S. Pat. No. 5,884,938, as well as Rink et al., U.S. Pat. No. 5,941,562. In at least one form of such recently developed inflator device, inflation gas is produced or formed, at least in part, via the decomposition or dissociation of a selected gas source material, such as in the form of a compressed gas and such as via the input of heat from an associated heat source supply or device. Nitrous oxide is a gas source material disclosed for use in accordance with one or more of these patents. As disclosed, such an apparatus for and method of gas generation can be helpful in one or more of the following respects: reduction or minimization of concerns regarding the handling of content materials; production of relatively low temperature, nonharmful inflation gases; reduction or minimization of size and space requirements and avoidance or minimization of the risks or dangers of the gas producing or forming materials undergoing degradation (thermal or otherwise) over time as the inflator awaits activation.

In general, inflators have specific performance and operational requirements which necessitate that the inflators, or at least particular components thereof, be checked for the occurrence or presence of undesired leaks. For example, compressed gas inflators, such as described above, commonly require the presence therein of at least a certain specified quantity of the particular compressed material in order for the inflator to be capable of properly performing in the manner for which is was designed. In such inflators, it is generally desired that the amount(s) of stored compressed material(s) be maintained in the inflator within at least certain prescribed tolerances in order to ensure proper operation of the inflator. While proper inflator operation can be variously defined, ultimately, an inflator and the associated airbag cushion need provide adequate vehicle occupant protection over an extended period of time (typically fifteen years or more) after original construction and installation in a vehicle. Further, beyond the simple functioning of the inflator and deployment of the associated airbag, such inflatable restraint systems typically need to deploy the associated airbag cushion in a proper and particularly desired manner.

Various methods are available and have been used to determine the leak rate of compressed gas inflators. In practice, a typical or usual leak detection method involves the use of helium as a tracer gas included in the particular stored gas contents. In such a method, a certain fraction of the composition of the stored gas which escapes from the inflator consists of helium. (The exact fraction of helium detected as a result of a particular leak may be equal, less than, or greater than the corresponding loading conditions of the originally stored compressed gas. The physics associated with these various situations, however, is beyond the scope of the present discussion. In general, however, these different situations are typically dependent on certain, particular factors, such as the magnitude of the leak, the total pressure within the storage vessel, as well as the initial gas composition, for example.)

The leak rate of helium from a pressure vessel is normally detected using a mass spectrometer system. For such specific practice, mass spectrometers are normally designed to detect the presence of helium in the gases constituting the sample. The utilization of helium in leak tracing is advantageous in several respects: a) First, since the presence of helium is rather rare in the atmosphere, background helium (or residual helium in the environment such as the environment surrounding the detection apparatus) is normally very low. As a result, the possibility of the mass spectrometer being falsely influenced and possibly producing a spurious signal is significantly reduced or minimized; b) Second, the mass spectrometer signals for certain different molecular species can be nearly the same. Consequently, the mass spectrometer signal produced or resulting from the presence or occurrence of one molecular species may interfere or mask the mass spectrometer signal produced or resulting from the presence or occurrence of a different molecular species. For example, the molecular weights of nitrous oxide and carbon dioxide are approximately 44.02 and 44.01, respectively. As a result, it can be very difficult to distinguish between these molecular species via mass spectrometry. Helium, however, with a molecular weight of four, produces a mass spectrometer signal that is relatively easily distinguishable from the signal produced by other potentially present species; and c) Third, helium is a relatively small monatomic gas, facilitating the passage thereof through even relatively small or narrow leak paths.

Conventional helium leak detection techniques, however, suffer or potentially suffer from a number of problems or disadvantages. For example, in order to permit checking for leaks to the relatively small range of leakage acceptable in airbag module inflators, it is commonly necessary to include relatively large amounts of helium in the compressed gas mixture. In practice, the amount of helium required for inclusion is typically dependent on factors such as the magnitude and type of leak, the design life of the inflator, and the criteria for adequate performance for the inflator as a function of time. However, the incorporation of even moderate amounts of helium within a compressed gas inflator is or can be disadvantageous as, for a given volume, the storage pressure of the contents is significantly increased through such helium inclusion. Conversely, at a given pressure, the storage volume provided in or by the device needs to be increased in order to accommodate the mass of the added helium.

While the release of stored or included helium would normally also be expected to contribute to the inflation of the associated airbag, the inclusion and use of two or more dissimilar species (such as helium, which is normally a gas that will not liquefy and nitrous oxide, an easily liquefied gas) is especially problematic. For example, as separation of such species can easily occur, in practice it may be difficult to ensure a uniform mixture composition. As a result, the use of two or more molecular species commonly necessitates the use of additional storage, handling, and mixing equipment.

A significant limitation on such use of helium in such leak detection schemes is that the leak rate from a pressure vessel normally cannot be accurately checked at a date substantially later than the date the inflator is manufactured unless the helium concentration within the vessel is known. That is, unless the pressure vessel satisfies the limitations of either originally only containing helium or the leak is of the type that the compressed gases (e.g., both the primary stored gas and the helium tracer gas) are escaping in equal proportion to that at which they were loaded (as in the original composition), then the leak rate determination at such later points in time will normally be in error. The inflator assembly use of a pressure vessel originally only containing helium presents significant design limitations such as due to the typical bulkiness and mass associated with appropriate such pressure vessels. Further, as knowledge of the type of leak cannot be definitively known a priori, the making of the assumption that both the primary stored gas and the helium tracer gas are escaping in equal proportion to that at which they were loaded can result in significant error.

Other possible limitations or drawbacks to the use of such helium leak detection techniques include that the occurrence or presence of liquid materials within the storage vessel may impede the passage of helium through the leak or otherwise "mask" the presence of the leak. For example, if a liquid with a relatively high surface tension is present in the vessel, such liquid could possibly flow into a hole through which gas would normally leak and may, at least temporarily, inhibit the passage of the gaseous leak trace material out of the inflator. However, with time, the liquid may no longer occupy the leak path and the stoppage of gas leakage therethrough may only be temporary.

In addition, though the occurrence or presence of helium in the general atmosphere is relatively rare, it will be appreciated that various manufacturing environments may produce, create, or have associated therewith relatively high background concentrations of helium. This may necessitate that a vessel to be tested be first isolated, such as by being placed in a closed chamber in which a vacuum is created in the surrounding environment, with the helium leak rate then being determined. Such special handling requirements can significantly add to the time and expense associated with the manufacturing process.

Further, the use of helium may undesirably result in the addition of considerable expense to the cost of the inflator, such as through the inherent cost of the helium itself, the cost of purchasing, calibrating, and maintaining the mass spectrometers, as well as the costs associated with the equipment required to store, mix, and handle the helium.

In view of the above, there has been a need and demand for a pressurized fluid-containing inflator design which facilitates leak detection. Further, there has been a need and demand for an inflator device which satisfies one or more of the following objectives: increased simplicity of design, construction, assembly, and manufacture; avoidance or minimization of the risks or problems associated with the storage, handling, and dispensing of gas generant materials; permits even further reductions in assembly weight and volume, or size; and realizes enhanced assembly and performance reliability.

At least partially in response to such needs and demands further efforts have led to the development of the apparatus for inflating an inflatable device and the methods of leak detection which are at least in part the subject of the above-identified patent: Rink et al., U.S. Pat. No. 5,884,938. For example, disclosed therein are embodiments utilizing cryogenically formed or frozen solid forms of gas source material. As disclosed, the inclusion and use of such cryogenically formed or frozen solid forms may facilitate and improve performance reliability, such as by minimizing or avoiding the appearance of possible leak paths in the resulting inflator devices. The inclusion of helium via a cryogenic or frozen solid form is generally not commercially practical nor realizable. Thus, in accordance with at least one embodiment disclosed in U.S. Pat. No. 5,884,938, the detection of the occurrence of a leak from an otherwise closed chamber which contains a pressurized fluid is accomplished through the inclusion of a selected quantity of a radioactive leak trace material within the chamber and then measuring the reduction or change in the radioactive signals emanating from the chamber.

While such a leak detection arrangement and method may successfully overcome, at least in part, some of the problems or shortcomings such as identified above with respect to conventional leak detection techniques and arrangements, there are continuing needs and demands for further improved systems and methods for the detection of leaks from devices adapted to contain a fluid at a relatively high internal pressure, such as certain inflator devices used in the inflation of an inflatable article, such as an inflatable vehicle occupant restraint airbag cushion used in inflatable restraint systems. In particular, there is a need and demand for systems and methods for the detection of leaks which avoid the need for inclusion of helium and which more effectively meet or satisfy one or more of the following objectives:

1. permits, facilitates, or is conducive to practice in a mass production environment,
2. allows or permits effective leak checking of a device or chamber at any selected point in time, including at a point in time substantially after manufacture or after return from the field,
3. can be applied to variously sized chambers or devices including very small chambers, such as chambers having storage cavities of $10^{-3}$ cc or even smaller, and
4. avoids or otherwise eliminates concerns, such as relating to the inclusion of a radioactive material, albeit in very low concentrations or relative amounts, in a manufactured product or device.

SUMMARY OF THE INVENTION

A general object of the invention is to provide a unique system and method of leak detection.

A more specific objective of the invention is to overcome one or more of the problems described above.

The general object of the invention can be attained, at least in part, through a system for use in leak detection which system includes a pressure chamber adapted to hold at least one test object having a wall which contains contents at a pressure of at least about 200 psi (1.38 MPa). The system also includes a source of a tracer gas medium, such as includes at least one radioactive trace material. In accordance with one particular preferred embodiment, such trace material is desirably in the form of a radioactive isotope, such as $Kr^{85}$, for example. The tracer gas medium source is in fluid communication with the pressure chamber whereby the tracer gas medium is externally applied to at least a portion of the wall.

The prior art generally fails to provide leak detection arrangements and methods for devices adapted to contain a fluid at a relatively high internal pressure, such as certain inflator devices used in the inflation of an inflatable article, such as an inflatable vehicle occupant restraint airbag cushion used in inflatable restraint systems and which arrangements and methods permit, facilitate, or are conducive to practice in a mass production environment, such as desired for economical practice. Further, the prior art generally fails to provide systems and methods for the detection of leaks from such devices or chambers at any selected point in time, including at a point in time substantially after manufacture. Still further, the prior art generally fails to provide systems and methods for the detection of leaks capable of effective practice with variously sized chambers or devices including very small chambers, such as chambers having storage cavities of $10^{-3}$ cc or even smaller.

The invention further comprehends a method of leak detection. In accordance with one preferred embodiment of the invention, such a method of leak detection involves externally applying a first quantity of a tracer gas medium containing at least one radioactive trace material to at least a portion of a first chamber wall containing a pressurized fluid at a pressure of at least about 200 psi (1.38 MPa) of at least one test object and subsequently measuring the radioactive signals emanating from the first chamber. In practice, the tracer gas medium is desirably externally applied to the chamber wall at a pressure greater than the internal pressure of the fluid contained within the chamber. Again, in accordance with one particular preferred embodiment, such trace material is desirably in the form of a radioactive isotope, such as $Kr^{85}$, for example.

As used herein, references to "combustion," "combustion reactions", and the like are to be understood to generally refer to the exothermic reaction of a fuel with an oxidant.

References to "decomposition," "decomposition reactions", and the like are to be understood to refer to the splitting, dissociation, or fragmentation of a single molecular species into two or more entities.

"Thermal decomposition" is a decomposition controlled primarily by temperature. It will be appreciated that while pressure may, in a complex manner, also influence a thermal decomposition, such as perhaps by changing the threshold temperature required for the decomposition reaction to initiate or, for example, at a higher operating pressure change the energy which may be required for the decomposition reaction to be completed, such decomposition reactions remain primarily temperature controlled. Pressure may also cause one or more of the dissociative materials to liquefy. It should be understood or appreciated by one skilled in the art that liquefaction, with the associated changes and differences in vapor and liquid volumes, densities, and specific heats, as well as the introduction of the latent heat of vaporization, may also significantly influence the decomposition behavior.

"Exothermic thermal decomposition" is a thermal decomposition which liberates heat.

The term "equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi = (F/O)_A / (F/O)_S$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

Other objects and advantages will be apparent to those skilled in the art from the following detailed description taken in conjunction with the appended claims and drawings.

DETAILED DESCRIPTION OF THE INVENTION

Figure 1:
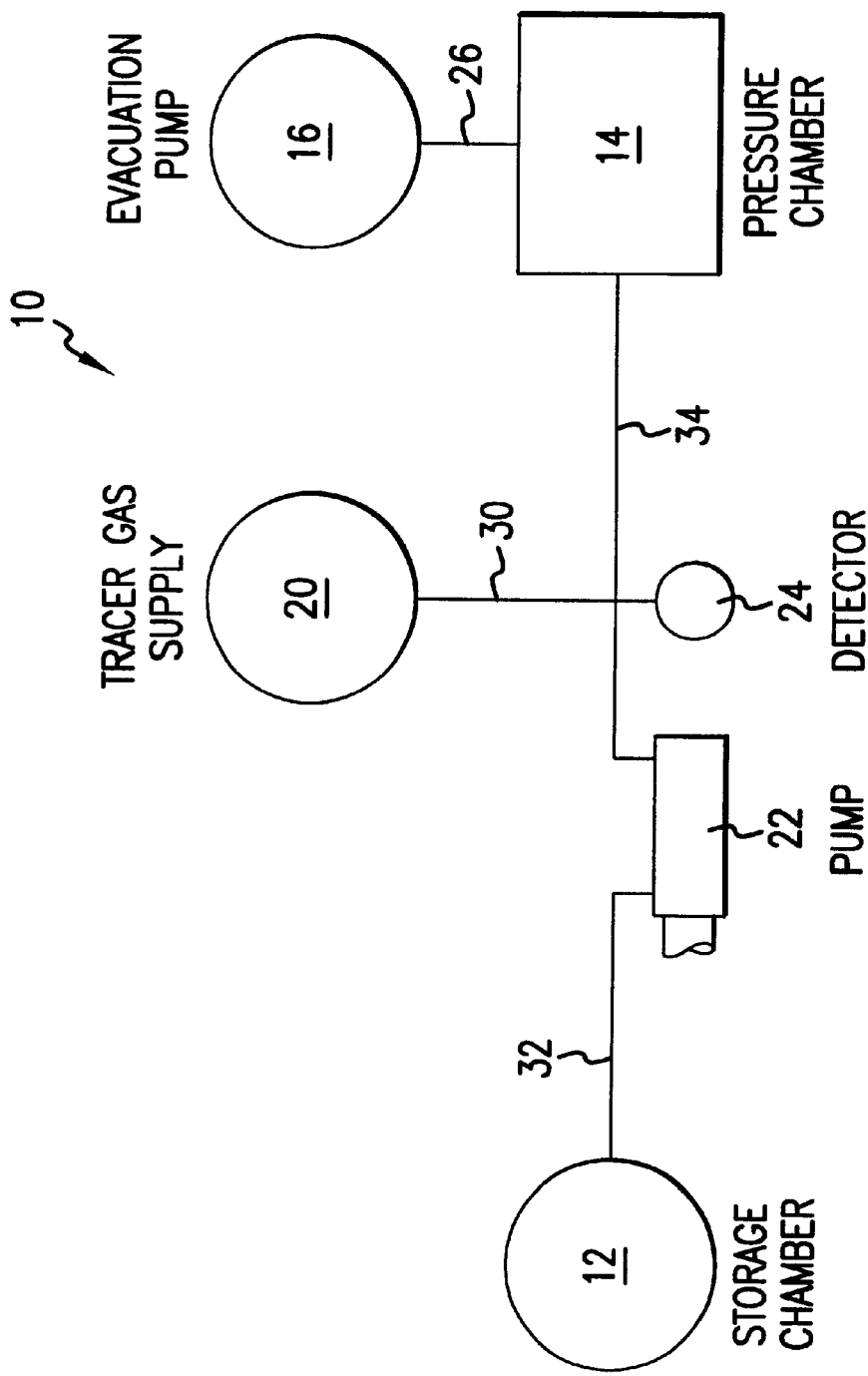
FIG. 1 is a simplified schematic of a system for use in leak detection, in accordance with one preferred embodiment of the invention.

The present invention provides improved detection methods and systems for use in the detection of leaks from devices adapted to contain a fluid at a relatively high internal pressure, such as certain inflator devices used in the inflation of inflatable articles, such as inflatable vehicle occupant restraint airbag cushions used in inflatable restraint systems.

In accordance with the invention, one or more "test objects" (i.e., devices adapted to contain a fluid at a relatively high internal pressure and from which devices the detection of leaks is being sought) are placed in a pressure chamber. The test objects are subsequently subjected to an external application of a selected tracer gas medium containing at least one radioactive tracer material. As described in greater detail below, the tracer gas medium is in practice externally applied to the test object at a pressure greater than the internal pressure within the test object. Such external applications are sometimes more commonly referred to as a "bombing" with the resulting treated test object commonly referred to as having been "bombed." The radioactive signals emanating from such a bombed test object can then be measured, such as in a manner well known to those skilled in the art. By such measurement, it can be determined if any of the radioactive tracer material has entered into the test object, such as through a leak path present or occurring therein. Further, in the event of entry of the radioactive tracer material into the test object, the radioactive signals emanating from the bombed test object can be used to evaluate the extent or magnitude of leak paths occurring in the test object. Those skilled in the art and guided by the teachings herein provided will appreciate that parameters of factors such as the concentration of the radioactive trace material included in the tracer gas medium, the pressure and time period the tracer gas medium is applied to the test object, as well as the magnitude of any leak in the test object will each affect the rate at which the radioactive trace material is introduced into the test object. Thus, through a proper understanding of the relationship between such parameters, the presence of radioactive material within the test object (as sensed or detected by an appropriate element such as known to those skilled in the art and guided by the teachings herein provided) can be related to the leak rate of the test object.

As will be described in greater detail below, a preferred practice of the invention utilizes a bombing cycle such as may desirably include the following process steps:

1. loading—at least one and preferably a plurality of test objects are appropriately loaded into a system pressure chamber;
2. evacuation—the external, i.e., outside the test object(s), atmosphere within the test object-loaded pressure chamber is withdrawn or otherwise appropriately evacuated;
3. bombing—the test object(s) are bombed or otherwise have externally applied thereto a tracer gas medium at a pressure greater than the internal pressure of the test object(s);
4. soaking—the test object(s) are soaked in the tracer gas medium for a selected period of time;
5. unloading or pressure reduction—the tracer gas medium is withdrawn from the pressure chamber and the pressure within the chamber is reduced below atmospheric pressure; and
6. removal—after the pressure within the pressure chamber has been returned to at least substantially atmospheric conditions, the treated test object are appropriately withdrawn from the pressure chamber and subjected to radioactive material detection.

While the invention, as described in greater detail below, can find application for the detection of leaks from various devices adapted to contain a fluid at a relatively high internal pressure, the invention was initially developed for use in the detection of leaks from compressed gas inflators and, in particular, inflator devices such as disclosed in the above-identified patents: Rink, U.S. Pat. No. 5,669,629; Rink et al., U.S. Pat. No. 5,884,938; and Rink et al., U.S. Pat. No. 5,941,562 wherein inflation gas is produced or formed, at least in part, via the decomposition or dissociation of a selected gas source material, such as nitrous oxide. It is to be understood, however, if desired and in accordance with certain preferred embodiments, the invention can be practiced in conjunction with relatively small volume pressure chambers devices, such as may be used for initiators used with such or similar inflator devices. In practice, such initiators include chambers which have storage cavities or volumes of about $10^{-3}$ cc or even less. Further, those skilled in the art and guided by the teachings herein provided will appreciate that the invention can find application to test objects which contain a fluid at relatively high internal pressures, such as an internal pressure of at least about 200 psi (1.38 MPa) and up to about 6000 psi (41.37 MPa).

Tracer gas media useful in the practice of the invention generally contain or include a radioactive trace material. Radioactive trace materials useful in the practice of the invention include various radioactive isotope trace materials such as disclosed in the above-identified patent Rink et al., U.S. Pat. No. 5,884,938. As disclosed therein, the radioactive isotope $Kr^{85}$ has found previous extensive use as a trace material. As a result, a vast quantity of commercial and practical experience has been accumulated in connection regarding such use of the radioactive isotope $Kr^{85}$. In view of such previous uses and experience, the radioactive isotope $Kr^{85}$ is believed to be a preferred trace material for use in the practice of the invention.

Tracer gas media used in a preferred practice of the invention include a small amount of a radioactive trace material, such as a selected radioactive isotope, in an appropriate carrier. In accordance with a preferred practice of the invention, a suitable carrier can desirably be in the form of a gas such as composed of an oxygen-containing gas, such as air, for example, an inert gas, such as nitrogen, argon, or helium, for example, or mixtures or combinations thereof, such as including combinations of two or more oxygen-containing gases, combinations of two or more inert gases, and combinations including at least one oxygen-containing gas and at least one inert gas. A preferred tracer gas media for use in the practice of the invention will generally contain or include less than about 5 molar percent of radioactive isotope trace material, e.g., radioactive isotope $Kr^{85}$. It is currently contemplated that a tracer gas media for use in the practice of at least certain preferred embodiments of the invention will generally contain or include less than about 1 molar percent of radioactive isotope trace material and, more preferably, less than about 0.1 molar percent of radioactive isotope trace material.

As identified above and in accordance with a preferred embodiment of the invention, a test object is bombed by the external application of a tracer gas medium at a pressure greater than the internal pressure within the test object. Increasing the differential between the pressure within the test object and the pressure outside the test object will in general serve to increase the rate at which trace material will be introduced through a leak in a test object. Thus, through the use of increased pressure differentials, the time required to leak test a test object can be reduced or minimized such as to improve manufacturing and production operation. In practice, however, the desirability of employing an increased pressure differential is tempered by the desire to avoid undesirably stressing at least certain components or elements such as may be included in various inflator designs. For example, inflators of various design commonly include or incorporate burst discs or other preformed features which may fail, invert, or otherwise be significantly weakened as a result of the application of too great a pressure differential. The pressure differential which a component such as a burst disc can withstand is normally influenced by a number of factors including: those related to mechanical properties (such as thickness, diameter, heat treatment, for example), material properties (e.g., composition), and structural features (such as the presence and use of support elements), as well as applicable preforming and prestressing processes.

The differential pressure desirably applied across a test object is in practice also related in a complex fashion to various specific parameters of the leak test. Specific such leak test parameters may, for example, include specific activity (e.g., the concentration of the trace material in the tracer gas medium), the bombing time, and the magnitude of a leak in a test object. The value of differential pressure utilized in the practice of the invention will generally represent a balance between the period of time available for the leak check process to be conducted, the specific activity of the tracer gas medium, and the size or magnitude of leak under detection.

As described in greater detail below, the invention is capable of being embodied in a variety of designs and practices. In the following described figures, leak detection systems of increasing design complexity and performance or production capabilities encompassed by the invention will be presented.

Turning first to FIG. 1, there is illustrated the present invention as embodied in a system, generally designated by the reference numeral 10, for use in leak detection in accordance with one preferred embodiment of the invention. The system 10 includes a storage chamber 12, a pressure chamber 14, an evacuation pump 16, a tracer gas medium introduction supply 20, a pump 22, such as in the form of a positive displacement pump, and a specific activity detector/monitor 24. In such system, one or more test objects (not shown) are placed in the pressure chamber 14. The evacuation pump 16 is then activated to substantially evacuate the ambient atmosphere, such as surrounds the one or more test objects, from within the pressure chamber 14 via the conduit 26. In accordance with a preferred practice of the invention, the pressure chamber 14 is desirably evacuated such as to desirably minimize subsequent undesired dilution of the concentration of the radioactive trace material, e.g., the radioactive isotope, $Kr^{85}$, contained in the tracer gas medium. Accordingly, it is generally preferred that the pressure chamber 14 be evacuated such as to have an internal gas pressure which is subatmospheric, preferably to have an internal gas pressure of about 2 mm Hg or less and, more preferably, an internal gas pressure of about 0.5 mm Hg or less.

A tracer gas medium, such as containing or including a radioactive trace material, such as the radioactive isotope $Kr^{85}$, is introduced into the substantially evacuated pressure chamber 14 either initially from the tracer gas medium introduction supply 20 via the conduit 30 or, in continued operation, from the storage chamber 12 via the conduit 32, using the pump 22 and the conduit 34. For example, the radioactive isotope $Kr^{85}$ is generally commercially available in small cylinders, having a subatmospheric internal pressure, from various vendors. Typically, such cylinders have an internal volume of about 500 cc and are filled with a mixture of 3 molar percent $Kr^{85}$ and 97 molar percent $Kr^{83}$. As will be appreciated, the use of cylinders whose contents are stored at subatmospheric pressure can desirably help avoid leakage of the radioactive material from the cylinder. Thus, in accordance with one preferred embodiment of the invention, a tracer gas medium introduction supply, such as composed of one or more of such cylinders, may be used.

In practice, the tracer gas medium is preferably introduced into the substantially evacuated pressure chamber 14 to the desired or required pressure, also sometimes referred to as the "bombing" or "soaking" pressure. In particular, the tracer gas medium is desirably introduced into the pressure chamber 14 such that bombing pressures of up to about 10,000 psia (68.95 MPa) can be achieved or realized within the pressure chamber 14.

As detailed below, the pump 22 can desirably be a positive-displacement, single-stroke pump that is used to achieve the desired bombing pressure or pressure level within the pressure chamber 14. Common forms or types of positive-displacement pumps include or are based on the inclusion of a piston or plunger arrangement, for example.

The test object(s) is then subjected to such tracer gas medium environment or atmosphere for a selected period of time. Such time period is sometimes referred to hereinafter as "soak time." After the test object(s) has been so soaked, the pump 22 is again activated this time to remove the tracer gas medium atmosphere from the pressure chamber 14 via the conduits 34 and 32 to return the radioactive tracer gas medium to the storage chamber 12. The pressure chamber 14 is then returned to atmospheric pressure and the treated, i.e., bombed, test object(s) removed therefrom.

The radioactive signals emanating from a bombed test object can then be measured to determine the presence and, if desired, the extent of leak paths occurring or present in the test object. For example, a well-known form of sensing element which can be used in the practice of the invention is composed of a scintillation crystal and a photomultiplier tube. In general, a scintillation crystal is simply a crystal that emits light when exposed to nuclear radiation. As will be appreciated, different types of such crystals are available and which crystals have been specifically tailored for measurement across the spectrum and intensity of radiation.

In accordance with one preferred embodiment of the invention, it has been found useful to utilize what is termed a "thallium-activated sodium iodine crystal." In particular, such a crystal is highly hydroscopic and is therefore commonly sealed within a housing, such as constructed of aluminum. Such an aluminum housing is relatively thin and, as such a housing construction is easily penetrated by gamma rays possibly emanating from a bombed test object, has little effect on the detection sensitivity of the housed crystal. The photomultiplier tubes associated with the crystals of such sensing elements are useful in converting the light pulses produced by such crystals to electrical signals which in turn can be easily counted such as to provide a measure of the amount of radiation in a particular component or object.

As will be appreciated, the radioactive-containing tracer gas medium utilized in such a system will generally over time, such as through continued operation and cycling, be subjected to dilution or certain impurities. Thus, to help ensure proper continued operation, the system 10 includes the specific activity detector/monitor 24 whereby the specific activity of the tracer gas medium can be determined and appropriately monitored.

As used herein, specific activity is an indication of the concentration of radioactivity within a selected or specified gas or gas mixture. For solid materials, specific activity is generally defined in terms of radioactivity per unit mass (e.g., micro curries per gram). When applied to gaseous mixtures, however, it is generally convenient to express specific activity in terms of a unit volume of the gaseous mixture. Additionally, for both theoretical and practical reasons, it is generally convenient to include the total pressure of a gaseous mixture in the expression of specific activity for the gaseous mixture. Therefore, as used herein, specific activity is defined in terms of radioactive content, pressure and volume, e.g., in units of micro currie per atmosphere per cubic centimeter (micro curries/atm·cc).

In the preferred practice of the invention, the specific activity of the tracer gas medium is desirably maintained or controlled within certain prescribed limits. For example, in accordance with a preferred embodiment of the invention, the specific activity of the tracer gas medium is maintained or controlled in the range from 1 to 500 micro curries/atm·cc, more preferably, the specific activity of the tracer gas medium is maintained or controlled in the range from 10 to 300 micro curries/atm·cc and, even more preferably, the specific activity of the tracer gas medium is maintained or controlled in the range from 50 to 200 micro curries/atm·cc.

As those skilled in the art and guided by the teachings herein provided will appreciate, if the specific activity of the tracer gas medium used in the practice of the invention is very high, then for a given "bombing time" a relatively large amount of radioactive material can be introduced within a particular test object. A system featuring the use of a tracer gas medium exhibiting a very high specific activity, e.g., a specific activity in excess of 500 micro curries/atm·cc, would typically necessitate the inclusion or use of heavy shielding in order to provide the desired level of protection to operators as well as require careful handling of components or articles exposed to such high specific activity material.

On the other hand, if a system features the use of tracer gas medium exhibiting a low specific activity, e.g., a specific activity of about 5 micro curries/atm·cc or less, then the components or articles being so exposed or bombed would require significantly extended or prolonged exposure or bombing times or periods (or exposure at very high differential pressures) in order to ensure the introduction of measurable quantities of radioactive material within the test object should a leak path be present therein.

The soak time required for a test object in accordance with the invention is generally inversely related to both the specific activity of the tracer gas medium and the difference between the square of the test object external pressure (i.e., the pressure outside the test object) and the square of the test object internal pressure (i.e., the pressure inside the storage chamber of the test object). Thus, if a tracer gas medium of reduced or lower specific activity is used while the bombing pressure remains the same, then the bombing time to which the test object is subjected need correspondingly be increased.

It will be appreciated that, as an alternative, the external pressure (i.e., the bombing pressure) can be increased. As identified above, however, the external pressure cannot in practice be arbitrarily increased as, for example, many airbag inflator devices contain a burst disc such that when subjected to a sufficiently elevated external pressure, the burst disk may invert and thus cause or result in a reduction in the performance capabilities or strength thereof. In view of factors such as outlined above, proper system design typically involves a balancing of specific activity and external pressure.

While the system 10, based on the inclusion of a positive-displacement pump, is of relatively simple design, in practical terms the use of a positive-displacement pump can make it difficult for such a system to meet various practical requirements. For example, the physical characteristics of positive-displacement pumps may make the use thereof to achieve certain desired system operating characteristics, such as bombing pressures of up to about 10,000 psi (68.95 MPa) and subatmospheric evacuation of the pressure chamber 14, not practical. Further, positive-displacement pumps are generally not necessarily well suited for operation to draw a vacuum, thus removal of residual tracer gas medium from the chamber via sole operation of such a pump can be difficult.

Those skilled in the art and guided by the teachings herein provided will appreciate that at least some of such disadvantages or system shortcomings can be at least in part overcome by various system design modifications. For example, at least some of the drawbacks related to the use of a positive-displacement, single-stroke pump can be minimized through the system inclusion of a check valve upstream of the pump. In such a design modification, the check valve desirably will operate to close or prevent back flow therethrough after a stroke of the pump. In this manner, a single-stroke mechanism can potentially function several times such as may be desired or required to permit the achievement of a desired high pressure or vacuum operation.

It will be appreciated that a displacement pump may not be preferred for use in the system 10 described above where operation of the system over a wide range of operating conditions is desired. For example, a single-stroke positive displacement pump might need to be undesirably large in order to ensure proper gas removal from the system.

Figure 2:
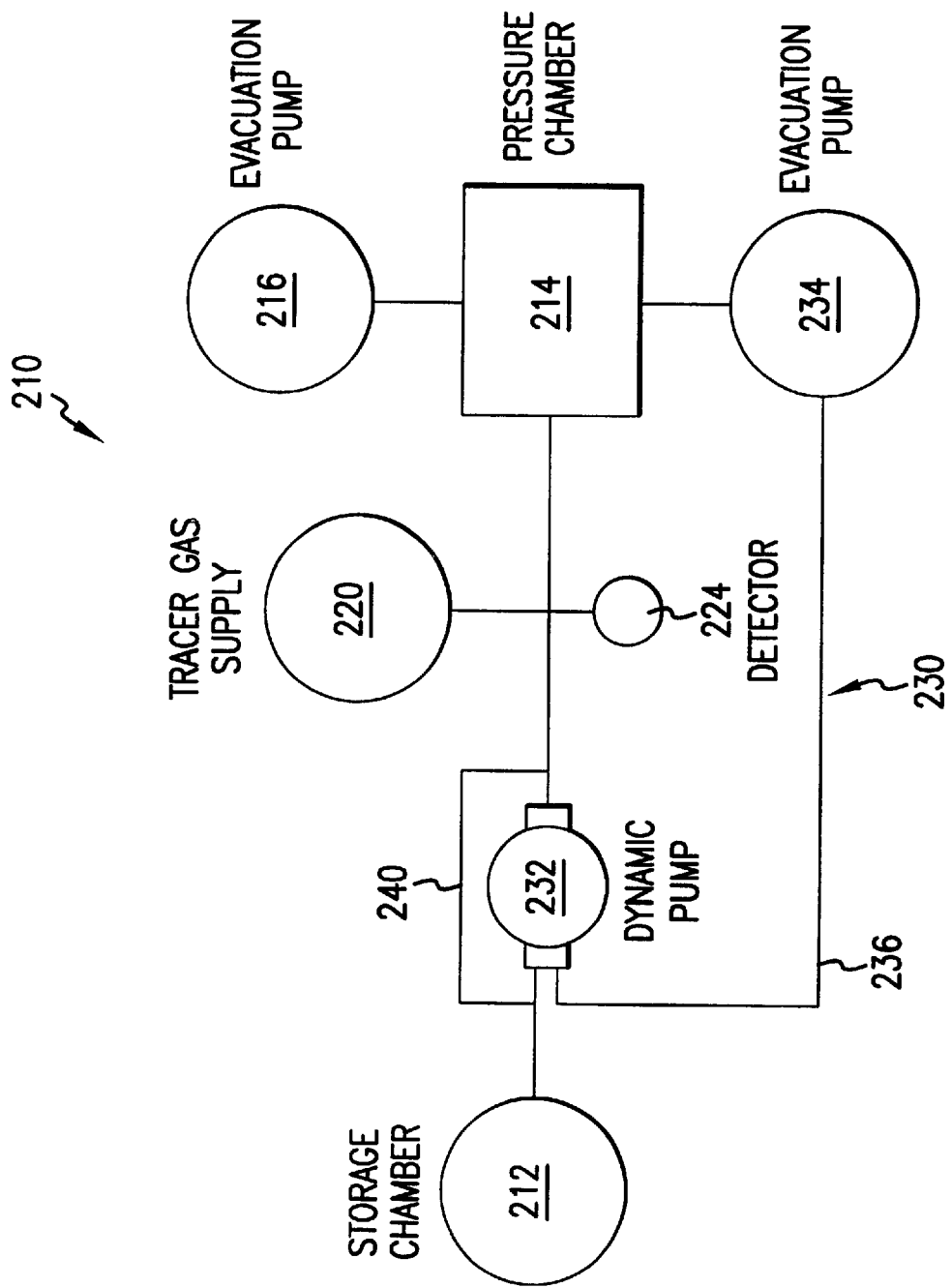
FIG. 2 is a simplified schematic of a system for use in leak detection in accordance with another preferred embodiment of the invention.

Alternatively, a multiple-stroke, positive displacement pump system might be envisioned. While such a system may be possible, it would likely suffer from various practical drawbacks, such as excessive heating of the gas mixture processed therethrough, pump reliability issues, and more complex control mechanisms. In view thereof, FIG. 2 illustrates the present invention as embodied in a system, generally designated by the reference numeral 210, for use in leak detection in accordance with another preferred embodiment of the invention and which system desirably overcomes at least some of the shortcomings of a system based on a single-stroke displacement pump. The system 210, similar to the system 10 described above, includes a storage chamber 212, a pressure chamber 214, an evacuation pump 216 (here designated as a first evacuation pump), a tracer gas medium introduction supply 220, and a specific activity detector/monitor 224. As described in greater detail below, however, the system 210, rather than a single-stroke displacement pump as in the system 10, includes a pumping system combination 230 composed of a dynamic pump 232 and a second evacuation pump 234 joined or interconnected by a conduit 236.

The system 210 generally operates in a manner similar to that described above relative to the system 10 shown in FIG. 1. For example, during a normal or typical operating cycle, the dynamic pump 232 is simply operated until the required bombing pressure within the pressure chamber 214 is achieved or realized. Operation of the system 210, however, perhaps differs most significantly from operation of the system 10 with regards to when the tracer gas medium atmosphere is to be withdrawn from the pressure chamber 214 and returned to the storage chamber 212. While the dynamic pump 232 is used in such operation, dynamic pumps which are well suited to produce high pressures cannot generally efficiently withdraw gas from the pressure chamber 214 once the pressure within the chamber 214 has been reduced to near atmospheric or sub-atmospheric levels. Thus, the system 210 includes, as a part of the pumping system 230, the second evacuation pump 234 such as may serve to further reduce the pressure within the pressure chamber 214 during the unloading or pressure reduction portion of the operating cycle. In practice, such a second evacuation pump 234 is desirably designed to be effective at the low pressures required for such operation. As a result, such an evacuation pump is generally ineffective for pumping directly into the relatively high pressure environment associated with the storage chamber 212. Therefore, the evacuation pump 234 can desirably be used to feed gas withdrawn from the pressure chamber 214 to the dynamic pump 232 via the conduit 236. The dynamic pump 232 can desirably serve to more effectively pump to higher pressures. To that end, the system 210 also includes a recycle loop conduit 240 whereby gas pumped through the dynamic pump 232 can be recycled (i.e., returned or otherwise directed to the storage chamber 212). Valves and other customary piping connections, the inclusion of which and manner of operation are well known to those skilled in the art, have not been shown in the system illustration shown in FIG. 2 in the interest of simplifying illustration and facilitating comprehension.

Figure 3:
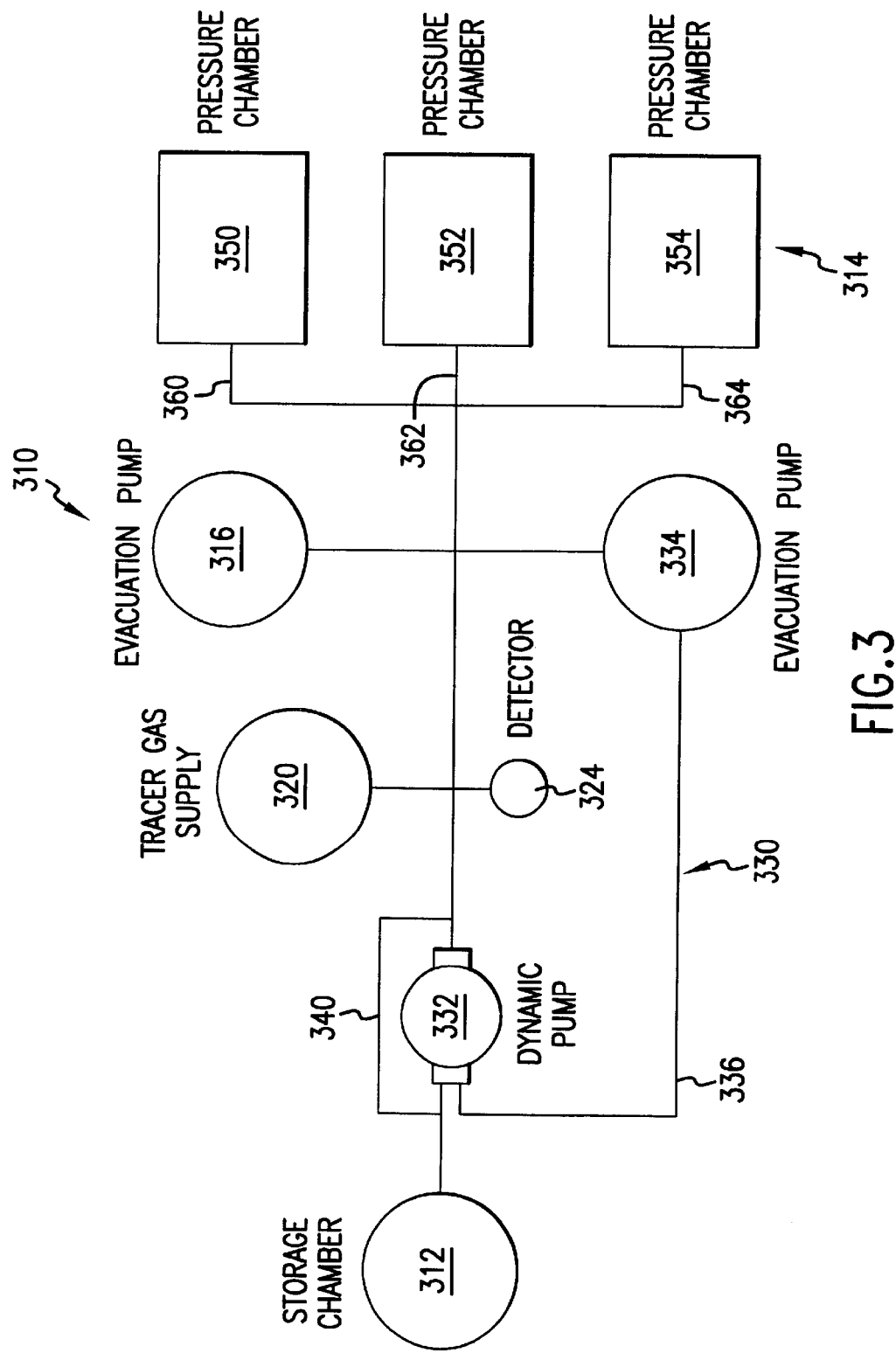
FIG. 3 is a simplified schematic of a system for use in leak detection in accordance with yet another preferred embodiment of the invention.

Turning now to FIG. 3, there is illustrated a simplified schematic of a system 310 for use in leak detection in accordance with yet another preferred embodiment of the invention and such as better adapted or suited for use in such leak detection on a large scale or in a mass production environment.

The system 310, similar to the system 210 described above, includes a storage chamber 312, a first evacuation pump 316, a tracer gas medium introduction supply 320, a specific activity detector/monitor 324, a pumping system combination 330 composed of a dynamic pump 332 and a second evacuation pump 334 joined or interconnected by a conduit 336 and includes a recycle loop conduit 340 whereby gas pumped through the dynamic pump 332 can be recycled (i.e., returned or otherwise directed to the storage chamber 312). The system 310 primarily differs from the system 210 by the inclusion of a plurality of pressure chambers 314 such as joined in parallel. For the system 310, the pressure chambers 314 are individually designated as first, second and third pressure chambers and by the reference numerals 350, 352, and 354, respectively.

As will be appreciated, the system 310 generally permits for more efficient operation, such as by permitting a tracer gas medium atmosphere to be directly transferred or moved between two of the pressure chambers 314 without necessitating or requiring that the tracer gas material medium be first returned to the storage chamber 312 and then subsequently directed or fed into the desired pressure chamber. For example, after completion of the bombing portion of the operating cycle, the tracer gas medium contained within the first pressure chamber 350 can be transferred, such as via the conduits 360 and 362, to the second pressure chamber 352 or, such as via the conduits 360 and 364, to the third pressure chamber 354 rather than being returned to the storage chamber 312 and then later fed to the particular desired pressure chamber 314.

Further, with the use of multiple pressure chambers 314, the system 310 permits the cycle operation of two or more of the pressure chambers 314 to desirably be overlapped, such as to increase the system test object output rate and increase operator efficiency. For example, simultaneously with the withdrawing of the tracer gas medium from the first pressure chamber 350, bombing of test objects in the second pressure chamber 352 and loading of test objects into the third pressure chamber 354 can be occurring.

While FIG. 3 illustrates the system 310 as including three pressure chambers 314 connected in parallel, it will be appreciated by those skilled in the art and guided by the teachings herein provided that the broader practice of the invention is not necessarily so limited. For example, the particular number of pressure chambers selected for inclusion in the practice of the invention can be appropriately selected such as to provide particular system operation and performance capabilities as may be desired in particular installations.

Figure 4:
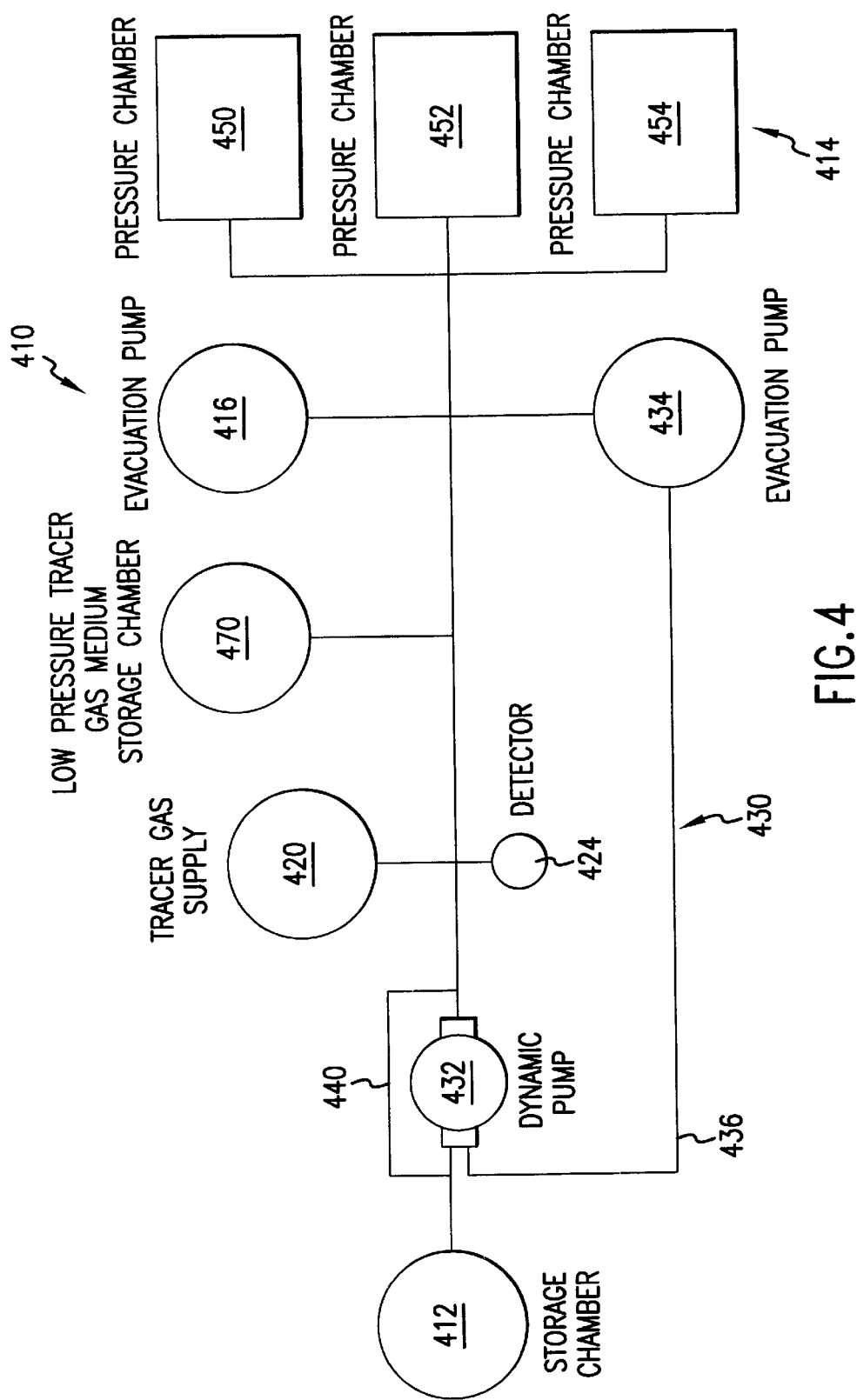
FIG. 4 is a simplified schematic of a system for use in leak detection in accordance with yet still another preferred embodiment of the invention.

Turning now to FIG. 4, there is illustrated a simplified schematic of a system 410 for use in leak detection in accordance with yet still another preferred embodiment of the invention.

The system 410, is generally similar to the system 310 described above and includes a storage chamber 412, a plurality of pressure chambers 414, such as joined in parallel (individually designated as first, second, and third pressure chambers and by the reference numerals 450, 452, and 454, respectively), a first evacuation pump 416, a tracer gas medium introduction supply 420, a specific activity detector/monitor 424, a pumping system combination 430 composed of a dynamic pump 432 and a second evacuation pump 434 joined or interconnected by a conduit 436 and includes a recycle loop conduit 440 whereby gas pumped through the dynamic pump 432 can be recycled (i.e., returned or otherwise directed to the storage chamber 412) as described above.

The system 410 primarily differs from the system 310 through the inclusion of a low pressure tracer gas medium storage chamber 470. In practice, the low pressure tracer gas medium storage chamber 470 provides a useful confined volume wherein tracer gas medium withdrawn from one of the pressure chambers 414 can be deposited or temporarily held pending the freeing or opening of another of the pressure chambers 414 whereinto the previously withdrawn tracer gas medium is ultimately to be placed. As will be appreciated by those skilled in the art and guided by the teachings herein provided, through the incorporation and use of such a low pressure tracer gas medium storage chamber, the tracer gas medium can advantageously be held or stored at relatively low pressures during those periods of time when the system is not in operation. For example, such a low pressure storage chamber can desirably be utilized to effect overnight storage of tracer gas medium. By storage at relatively low pressures, reliance on high pressure seals for prolonged periods of time can be avoided or minimized, and the need for excessive radiation shielding can be minimized or avoided.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Examples 1–3

In each of these Examples, a test vessel containing a load of gas material at an elevated pressure was subjected to external "bombing" with a tracer gas medium containing the radioactive isotope trace material, $Kr^{85}$.

In each case, a test vessel with an internal volume of 12.5 $in^3$ (204.8 cc) and constructed of impact extruded AISI-SAE 1513 steel was used. The cylindrical test vessel had a tubular side wall 0.130 in (3.3 mm) thick with a base and a cap each 0.295 in (7.5 mm) thick.

Example 1

As described below, the test vessel was initially filled with a very small amount of $Kr^{85}$ so as to permit the decay rate of the $Kr^{85}$ to be monitored. In particular, the test vessel was initially evacuated and then filled with a mixture of 0.01 molar % $Kr^{85}$ in air to a pressure of 2 mm Hg. The test vessel was then filled with an additional 83.5 grams of a gas mixture consisting of 20 percent nitrous oxide, 70 percent argon and 10 percent helium (where such percentages are on a molar basis). The filled vessel was sealed using ball-weld technology, as is known in the art. Using a modified Benedict-Webb-Rubin (BWR) equation of state calibrated for this mixture, the initial pressure within the vessel at 21° C. was about 3400 psia (23.44 MPa).

The mass of the loaded test vessel was periodically determined over the course of a period of time in order to quantify the leak rate from the test vessel. In particular, the mass was measured monthly for a period of 426 days. The test vessel was kept thoroughly clean and free of external organic material during the evaluation period. In addition, the vessel was stored in a moisture-free, hermetic environment to prevent external corrosion as corrosion may adversely affect the periodic mass measurements.

Over the course of the 426 day measurement period, the loaded vessel lost 2.49 grams in mass. Thus, the gas pressure within the vessel after the 426 days was calculated to be about 3363 psia (23.19 MPa) at 21° C. Assuming a viscous leak rate model (e.g., a "Poiseuille flow", as is known in the art), this corresponds to a leak rate of approximately 4.5× $10^{-6}$ atm·cc/sec. In connection therewith, it is noted that particular inflators (e.g., such as certain inflators intended for roughly 30 liter inflatable curtain applications) have been known to contain about 80 grams of a gas mixture composed of 20 percent nitrous oxide, 70 percent argon, and 10 percent helium and must not exceed a leak rate of more than about $5\times10^{-6}$ atm·cc/sec in order to ensure adequate inflator performance over the life of the inflator.

As the test vessel was originally filled with a very small amount of $Kr^{85}$, the loaded test vessel was subjected to a baseline radiation measurement so as to permit an understanding of the amount of radioactivity which would subsequently be introduced into the vessel during the leak check bombing procedure. Such radiation measurement and other radiation measurements made during the course of this Example were done by placing the particular test object on top of a shielded flat scintillation crystal. It will be appreciated that while this flat crystal was of high radioactivity-measuring sensitivity, other forms of scintillation crystals may be preferred for commercial practice of the invention. For example, a tunnel or tubular form of scintillation crystal may better permit the detection of radiation emanating from the test object in various directions.

The loaded test vessel was subsequently subjected to a tracer gas medium composed of a dilute mixture of 0.00006 molar % $Kr^{85}$ in argon at a bombing pressure of 4500 psi (31.0 MPa) for ninety-seven minutes. NOTE: As this example was conducted manually, a tracer gas medium having a specific activity of only 3.4 micro curries/atm·cc was used to ensure a desired margin of safety for the operator. This specific activity is well below the anticipated system design limit of 300 micro curries/atm·cc. As a result, the differential pressure between the external and internal environments of the test vessel was 1137 psid (7.84 MPa) for ninety-seven minutes.

Those skilled in the art will appreciate that the specific activity of the tracer gas medium, in accordance with a preferred practice of the invention, is anticipated to be directly proportional to the rate at which radioactive material is introduced into the vessel. Thus, should the specific activity of the tracer gas medium be increased by a factor of one hundred, then it would normally be expected to take only about 1/100 as long to introduce the same amount of the tracer gas medium. As will be appreciated, the ability to use higher specific activities in practice can significantly reduce bombing times and thus have practical production consequences.

It was found that the bombing procedure resulted in an increase of 1420 counts/minute above the initial background reading (taken prior to bombing). Calibration of the scintillation crystal and detection arrangement indicates that this increase in radioactivity corresponds to the introduction of 1.1 micro curries of radioactive material into the vessel. This radioactivity level is well beyond the measurement uncertainty of the scintillation crystal and detection arrangement employed in this test, which was estimated to be about 352 counts/minute and which corresponds to ±0.26 micro curries of radioactive material.

Examples 2 and 3

In these Examples, the above procedure was repeated, but now employing bombing pressures of 5000 psia (34.47 MPa) and 5500 psia (37.92 MPa), respectively. Thus, in Example 2 the differential pressure was 1637 psid (11.29 MPa) and in Example 3 the differential pressure was 2137 psid (14.73 MPa). In the bombing operations of both Examples 2 and 3, the specific activity was with some difficulty sought to be maintained as close as possible to 3.4 micro curries/atm·cc and the bombing time maintained at ninety-seven minutes.

The bombing procedures of Examples 2 and 3 resulted in radiation count increases of 1199 counts/minute and 609 counts/minute, respectively, above the initial background reading (taken prior to bombing). Calibration of the scintillation crystal and detection arrangement indicates that such increases in radioactivity correspond to an introduction, into the respective test vessels, of 0.90 micro curries of radioactive material (Example 2) and of 0.46 micro curries of radioactive material (Example 3).

Discussion of Results

Figure 5:
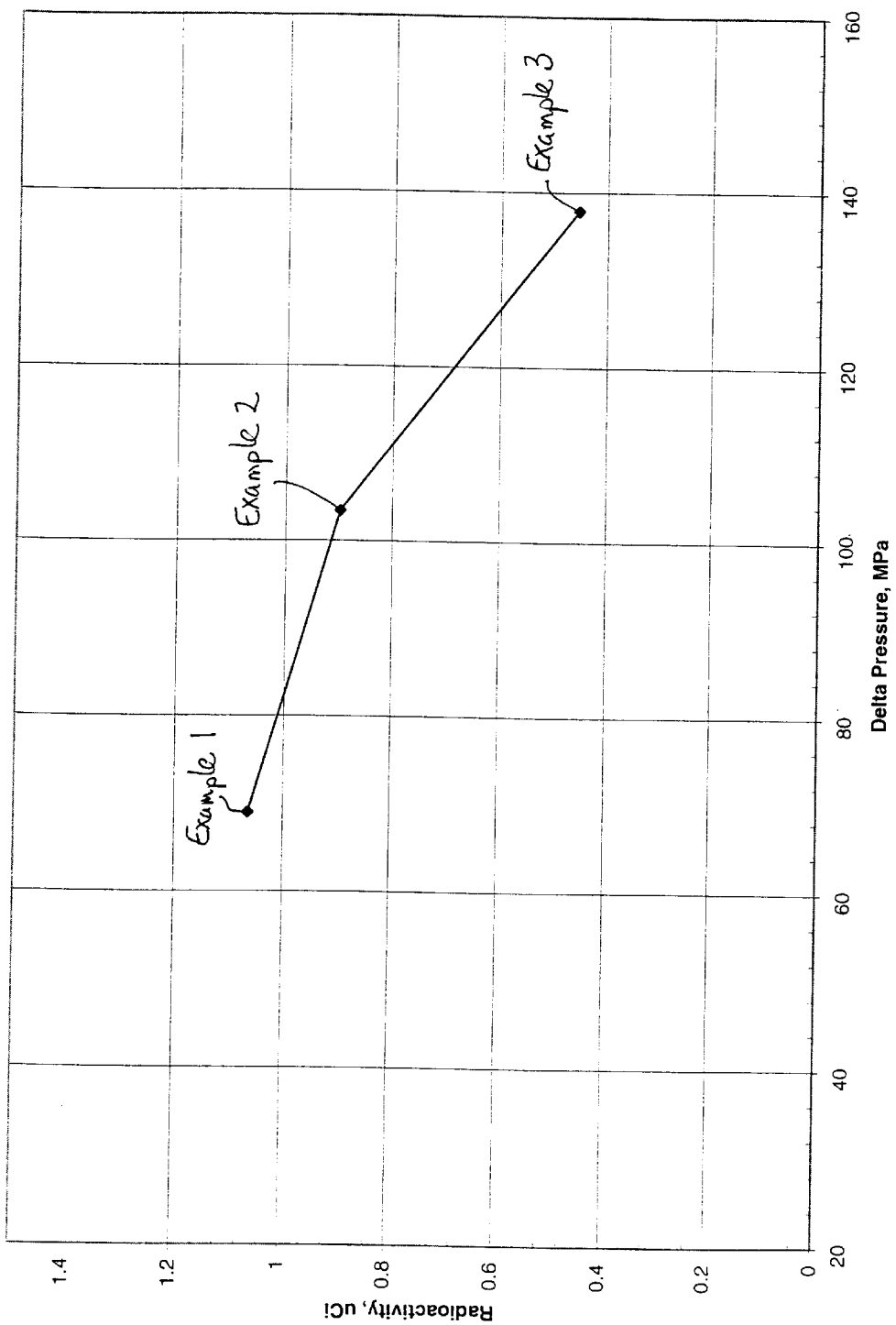
FIG. 5 is a graphical depiction of radioactivity introduced into the test object as a function of delta pressure realized in Examples 1–3, respectively.

FIG. 5 is a graphical depiction of radioactivity introduced into the test object as a function of delta pressure realized in Examples 1–3, respectively. These results clearly demonstrate that even when employing a tracer gas medium having a specific activity of only 3.4 micro curries/atm·cc (whereas commercial practice may involve a tracer gas medium having a significantly higher specific activity, such as increased by a factor of about a one hundred), such external bombing can result in introduction of a significant quantity of such trace material into a pressurized chamber test object.

Examples 4 and 5

In these Examples, the procedure of Example 1, above, was repeated but now employing tracer gas mediums having specific activities of 2.6 micro curries/atm·cc and 1.7 micro curries/atm·cc, respectively.

The bombing procedures of Examples 4 and 5 resulted in the introduction of 0.65 and 0.15 micro curries of radioactive material into the respective test objects of Examples 4 and 5.

Discussion of Results

Figure 6:
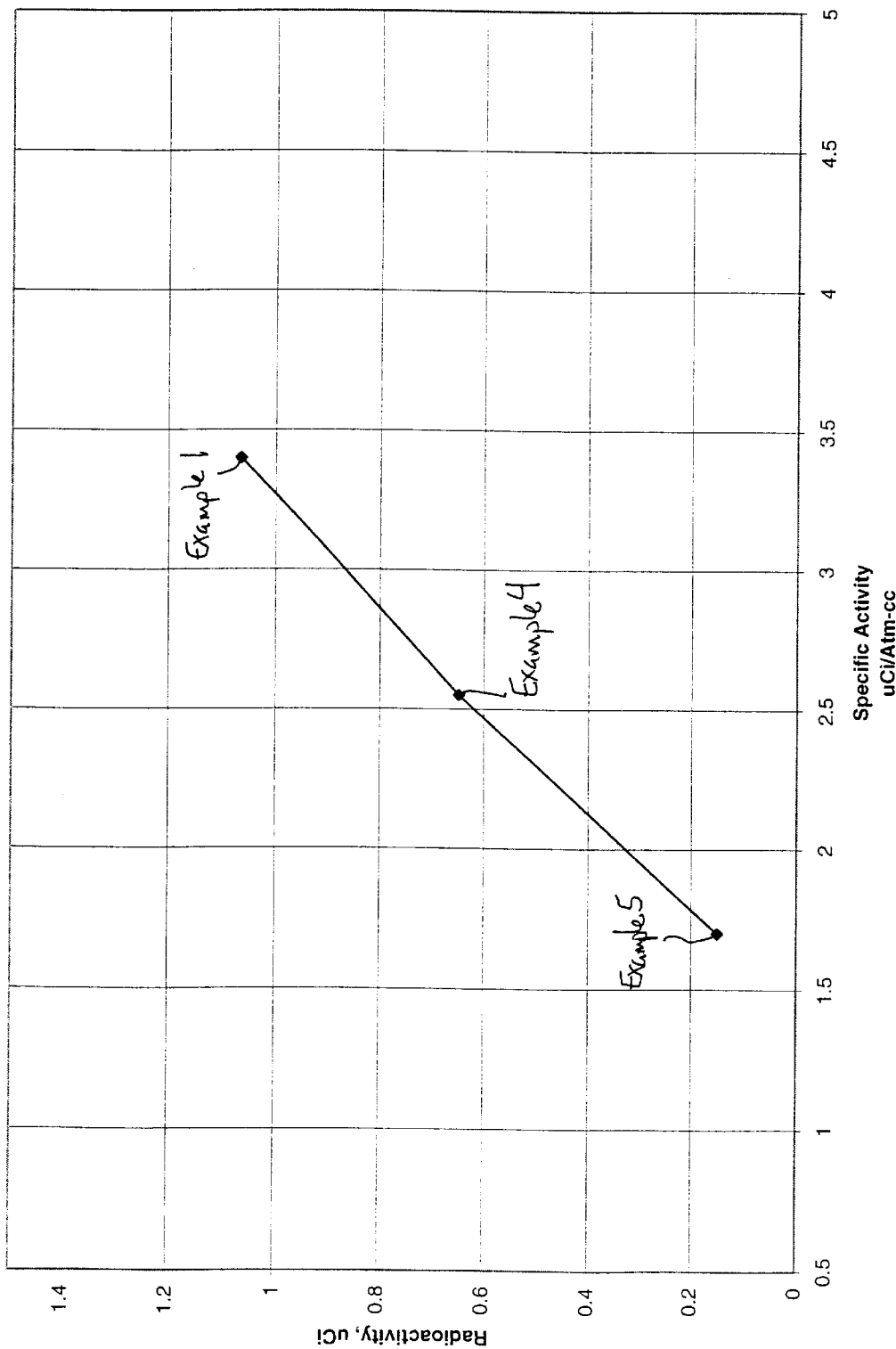
FIG. 6 is a graphical depiction of radioactivity introduced into the test object as a function of specific activity of the tracer gas medium for Examples 1, 4, and 5, respectively.

FIG. 6 is a graphical depiction of radioactivity introduced into the test object as a function of specific activity of the tracer gas medium realized for Examples 1, 4, and 5, respectively.

As shown in FIG. 6, an increase in the specific activity of the tracer gas medium, assuming all other parameters remain the same, results in the introduction of correspondingly more radioactive material into a respective test object. In view thereof, the use of tracer gas media of increased specific activities appears to be an attractive avenue for reducing bombing times consistent with desired production and manufacturing schedules or regimes.

Those skilled in the art and guided by the teachings herein provided will appreciate that external contamination such as may be present on the surfaces of vessels being evaluated can lead to erroneous results. Generally speaking, organic materials can effectively absorb radioactive materials, such as $Kr^{85}$. In view thereof, care must be taken with regard to plastics, labels (e.g., warning labels, identification labels, and the like), and various hydrocarbon contaminates (such as residual oils, for example) which may be present or associated with items being tested. With experience, an understanding of the adsorption of such radioactive materials by such organic materials will be gained. For example, if the amount of such radioactive material adsorbed is less than the amount of the radioactive material introduced during the bombing operation and does not adversely affect the sensitivity of the leak rate measurement, then the presence of such organic materials will generally not be an issue.

It appears that it will generally be the case that either or both the amount of such radioactive material absorbed will be more than the amount of the radioactive material introduced during the bombing operation or may adversely affect the sensitivity of the leak rate measurement. Thus, in an effort to address such possible complication, it may be desirable that test items, such as inflator devices, be particularly designed. For example, for an inflator device which includes a plastic body initiator, the device design will be such that the initiator is installed into the inflator device only after the leak check process has been applied to device pressure chamber. As will be appreciated, initiator squibs commonly represent a significant portion of the material cost for an inflator device. Thus, an inflator device design wherein the initiator is installed after the device pressure chamber has passed the leak check process avoids situations wherein a good initiator is discarded with a leaking pressure vessel or a good initiator is sought to be salvaged through the added step of removing an installed initiator component from the device.

Labels, such as those containing warnings or tracking indicia and such as typically include or have an organic-based binder or adhesive, may also be problematic. Thus, in accordance with a preferred embodiment of the invention, it is generally preferred that test objects undergo leak detection prior to the application of such labels thereto.

Should contamination via external oils or the presence of other hydrocarbons on the surface of a test object present a concern, precautions with regard to the cleaning or other pretreating of particular test objects may be desired. For example, those skilled in the art and guided by the teachings herein provided will appreciate the desirability in at least certain situations of cleaning such test objects with an appropriate solvent that leaves little or no residue.

Those skilled in the art and guided by the teachings herein provided will appreciate that the relationship between factors such as the volume of the chamber undergoing leak checking, the mass of radioactive trace material introduced into the chamber, the magnitude of any leak from the chamber, and the period of time necessary for gas to escape through the leak, for example, are in practice commonly intertwined. For example, in a situation wherein a chamber being leak checked is relatively small and the leak rate from that chamber is relatively large, the gas contents would escape relatively quickly from the chamber. In such a situation, it may be possible that all the gaseous contents of the chamber may escape therefrom prior to the test object actually undergoing a leak check procedure in accordance with the invention and as a result lead to an erroneous result, e.g., acceptance of a bad part, i.e., a part having an undesirably high leak rate.

In view of such concerns, various precautions or other desirable measures can be employed or otherwise utilized. For example, practice of the invention using significantly increased bombing pressures (e.g., such as bombing pressures appropriately selected in the range of about 200 psi (1.38 MPa) to about 10,000 psia (68.95 MPa)) can serve to reduce or minimize such concerns. Further, such concerns may not be as significant when applied to relatively large chambers such as commonly present in various current commercial inflators.

Thus, the invention provides improved leak detection arrangements and methods for devices adapted to contain a fluid at a relatively high internal pressure, such as certain inflator devices used in the inflation of an inflatable article, such as an inflatable vehicle occupant restraint airbag cushion used in inflatable restraint systems and which arrangements and methods permit, facilitate, or are conducive to practice in a mass production environment, such as desired for economical practice. Further, the invention provides systems and methods for the direct detection of leaks from such devices or chambers independent of the chemical composition of the contents thereof or the period of time elapsed since the device or chamber was originally filled, the invention facilitates and permits leak detection from such device or chamber at any selected point in time, including at a point in time substantially after manufacture. Still further, the invention provides systems for use in leak detection and methods for the detection of leaks capable of effective practice with variously sized chambers or devices including very small chambers, such as chambers having storage cavities of $10^{-3}$ cc or even smaller. Yet still further, as helium cannot practically be frozen and the invention avoids relying on the inclusion or use of helium, the invention facilitates the more widespread application and use of devices utilizing the cryogenic fill techniques, such as disclosed in above-identified Rink et al., U.S. Pat. No. 5,884,938.

Further, while the invention has been described above making particular reference to the detection of leaks from inflator devices used in the inflation of an inflatable article, such as an inflatable vehicle occupant restraint airbag cushion used in inflatable restraint systems, it is to be understood that the broader practice of the invention is not necessarily so limited. For example, the invention can be practiced, as may be desired, in connection the detection of leaks from other selected forms or types of devices adapted to contain a pressurized fluid at a relatively high internal pressure. Typically, such forms or types of devices depend on the containment or storage of a selected fluid material at a sufficiently elevated pressure to assure that the device will provide sufficient quantity of gas to perform a particularly designed-for task, as in a mechanical deployment of an ejection system, release of an emergency door, extinguishment of a fire, or the like, for example.

As will further be appreciated, in addition to various selected forms or types of fluid storage devices, the invention can be practiced with devices which contain fluids of various selected composition including devices which contain or store pressurized corrosive gaseous materials, flammable gases, pharmaceutical materials, biological agents, or the like. In addition, in particular embodiments of the invention, it is to be understood that the particular stored fluid can be reactive or inert, as may be required in particular applications.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A system for use in leak detection comprising:
   a pressure chamber adapted to hold at least one test object, the at least one test object including a wall containing contents at a pressure of at least about 200 psi (1.38 MPa);
   a source of a tracer gas medium including at least one radioactive trace material, the tracer gas medium source in fluid communication with the pressure chamber whereby the tracer gas medium is externally applied to at least a portion of the wall; and
   a recycle system effective to withdraw at least a portion of the tracer gas medium from the pressure chamber and wherein at least a portion of the withdrawn tracer gas medium can be subsequently fed into the pressure chamber.

2. The system of claim 1 wherein the tracer gas medium additionally comprises a carrier comprising at least one gas selected from the group consisting of an inert gas, an oxygen-containing gas, and mixtures thereof.

3. The system of claim 1 wherein the at least one radioactive trace material comprises at least one radioactive active isotope trace material.

4. The system of claim 3 wherein the at least one radioactive isotope trace material comprises $Kr^{85}$.

5. The system of claim 1 wherein the pressure chamber is adapted to simultaneously hold a plurality of test objects.

6. The system of claim 1 comprising a plurality of pressure chambers each adapted to hold at least one of the test objects.

7. The system of claim 1 wherein the pressure chamber is adapted to hold at least one test object including a wall containing contents at a pressure of up to about 6000 psi (41.37 MPa).

8. The system of claim 1 wherein the tracer gas medium source in fluid communication with the pressure chamber comprises at least a low pressure source and a high pressure source.

9. The system of claim 1 wherein the tracer gas medium additionally comprises an oxygen-containing carrier gas.

10. The system of claim 9 wherein the oxygen-containing carrier gas is air.

11. The system of claim 1 additionally comprising a specific activity detector effective to monitor the specific activity of the tracer gas medium including the portion of withdrawn tracer gas medium subsequently fed into the pressure chamber.

12. A system for use in leak detection comprising:
   a pressure chamber adapted to hold at least one test object, the at least one test object including a wall containing contents at a pressure of at least about 200 psi (1.38 MPa); and
   a source of a tracer gas medium including at least one radioactive trace material, the tracer gas medium source in fluid communication with the pressure chamber whereby the tracer gas medium is externally applied to at least a portion of the wall, wherein the tracer gas medium source in fluid communication with the pressure chamber comprises at least a low pressure source and a high pressure source.

13. A method of leak detection comprising:
   externally applying a first quantity of a tracer gas medium containing at least one radioactive trace material to at least a portion of a first chamber wall containing a pressurized fluid at a pressure of at least about 200 psi (1.38 MPa) of at least one first test object; and
   measuring the radioactive signals emanating from the first chamber after the external application of the tracer gas medium.

14. The method of claim 13 wherein the tracer gas medium additionally comprises a carrier comprising at least one gas selected from the group consisting of an inert gas, an oxygen-containing gas, and mixtures thereof.

15. The method of claim 13 wherein the at least one radioactive trace material comprises at least one radioactive active isotope trace material.

16. The method of claim 15 wherein the at least one radioactive isotope trace material comprises $Kr^{85}$.

17. The method of claim 13 wherein the first quantity of the tracer gas medium is simultaneously externally applied to at least a portion of the first chamber wall of each of a plurality of first test objects.

18. The method of claim 13 wherein the at least one first test object includes a second chamber with a wall containing a pressurized fluid at a pressure of at least about 200 psi (1.38 MPa), the method additionally comprising:

externally applying a second quantity of a tracer gas medium containing at least one radioactive isotope trace material to at least a portion of the second chamber wall.

19. The method of claim 18 wherein the external application of the second quantity of the tracer gas medium sequentially follows the external application of the first quantity of the tracer gas medium.

20. The method of claim 13 additionally comprising externally applying a second quantity of the tracer gas medium to at least a portion of the first chamber wall of at least one second test object.

21. The method of claim 20 wherein the external application of the second quantity of the tracer gas medium to at least a portion of the first chamber wall of the at least one second test object sequentially follows the external application of the first quantity of the tracer gas medium to at least a portion of the first chamber wall of the at least one first chamber.

22. The method of claim 20 wherein the second quantity of the tracer gas medium is simultaneously externally applied to at least a portion of the first chamber walls of each of a plurality of second test objects.

23. The method of claim 13 wherein the at least one first chamber wall contains a pressurized fluid at a pressure of up to about 6000 psi (41.37 MPa).

24. The method of claim 9 wherein the tracer gas medium additionally comprises an oxygen-containing carrier gas.

25. The method of claim 24 wherein the oxygen-containing carrier gas is air.

26. The method of claim 9 additionally comprising determining a specific activity for the tracer gas medium prior to the external application thereof.

27. The method of claim 26 additionally comprising maintaining the specific activity of the tracer gas medium in the range from 1 to 500 micro curries/atm·cc.

28. The method of claim 26 additionally comprising maintaining the specific activity of the tracer gas medium in the range from 50 to 200 micro curries/atm·cc.

29. The method of claim 9 wherein the first test object is placed into a pressure chamber wherein the first quantity of the tracer gas medium is externally applied to at least the portion of the first chamber wall containing the pressurized fluid at the pressure of at least about 200 psi (1.38 MPa) and wherein, after the external application of the tracer gas medium and prior to measuring the radioactive signals emanating from the first chamber, the test object is removed from the pressure chamber, the method additionally comprising:

withdrawing at least a portion of the first quantity of the tracer gas medium from the pressure after the external application thereof and recycling at least a portion of the withdrawn tracer gas medium to the pressure chamber and externally applying a second quantity of the tracer gas medium to at least a portion of a first chamber wall containing a pressurized fluid at a pressure of at least about 200 psi (1.38 MPa) of at least one second test object, wherein second quantity of the tracer gas medium includes at least a portion of the recycled tracer gas medium.

30. The method of claim 29 additionally comprising maintaining the specific activity of the tracer gas medium externally applied to the second test object in the range from 1 to 500 micro curries/atm·cc.

31. The method of claim 29 additionally comprising maintaining the specific activity of the tracer gas medium externally applied to the second test object in the range from 50 to 200 micro curries/atm·cc.

* * * * *